US012759113B2

(12) United States Patent
Noniewicz et al.

(10) Patent No.: US 12,759,113 B2
(45) Date of Patent: Oct. 13, 2026

(54) DEVICE FOR DISPLACING A PUSH/PULL ROD IN STEPS

(71) Applicant: wolfcraft GmbH, Kempenich (DE)

(72) Inventors: Zbigniew Noniewicz, Kempenich (DE); Hans-Jürgen Schüller, Königsfeld (DE)

(73) Assignee: wolfcraft GmbH, Kempenich (DE)

( * ) Notice: Subject to any disclaimer, the term of this patent is extended or adjusted under 35 U.S.C. 154(b) by 246 days.

(21) Appl. No.: 18/835,438

(22) PCT Filed: Mar. 1, 2023

(86) PCT No.: PCT/EP2023/055080
§ 371 (c)(1),
(2) Date: Aug. 2, 2024

(87) PCT Pub. No.: WO2023/166010
PCT Pub. Date: Sep. 7, 2023

(65) Prior Publication Data

US 2025/0162107 A1 May 22, 2025

(30) Foreign Application Priority Data

Mar. 3, 2022 (DE) ..................... 10 2022 105 002.5

(51) Int. Cl.
*B25B 5/08* (2006.01)
*B25B 5/02* (2006.01)
*B25B 5/06* (2006.01)

(52) U.S. Cl.
CPC ................ *B25B 5/085* (2013.01); *B25B 5/02* (2013.01); *B25B 5/068* (2013.01)

(58) Field of Classification Search
CPC .... B25B 1/02; B25B 1/08; B25B 5/02; B25B 5/068; B25B 5/085; B25B 13/14
See application file for complete search history.

(56) References Cited

U.S. PATENT DOCUMENTS 6,578,837 B1 6/2003 Blank et al.
7,513,492 B1 4/2009 Kuo
(Continued)

FOREIGN PATENT DOCUMENTS

DE 10 2006 013 108 A1 9/2007
DE 10 2013 101 479 A1 8/2014
WO 99/04932 A1 2/1999

OTHER PUBLICATIONS

International Search Report in PCT/EP2023/055080, mailed May 16, 2023.

*Primary Examiner* — Christopher J. Besler
(74) *Attorney, Agent, or Firm* — Collard & Roe, P.C.

(57) ABSTRACT

A device for displacing a push/pull rod in steps includes a housing and a drive lever that is supported by the housing and displaces a drive element, which engages on the push/pull rod, forward in a clamping direction relative to the housing during an advancing actuation. A blocking element is supported by the housing and prevents a reverse displacement of the push/pull rod in a release direction opposite the clamping direction in a blocking position and which can be displaced from the blocking position into a release position by actuating a release lever that engages on the blocking element. A movement limiting element is struck by the blocking element during a forward displacement of the drive element, the forward displacement carrying the push/pull rod. The movement limiting element is acted upon by a spring element against the blocking element and is arranged in a pocket of the release lever.

9 Claims, 9 Drawing Sheets

(56) References Cited

U.S. PATENT DOCUMENTS

| | | | |
|---|---|---|---|
| 9,579,775 B2 | 2/2017 | Noniewicz et al. | |
| 2015/0375369 A1* | 12/2015 | Noniewicz | B25B 5/068 24/522 |

* cited by examiner

State of the art

State of the art

33'

DEVICE FOR DISPLACING A PUSH/PULL ROD IN STEPS

CROSS REFERENCE TO RELATED APPLICATIONS

This application is the National Stage of PCT/EP2023/055080 filed on Mar. 1, 2023, which claims priority under 35 U.S.C. § 119 of German Application No. 10 2022 105 002.5 filed on Mar. 3, 2022, the disclosure of which is incorporated by reference. The international application under PCT article 21 (2) was not published in English.

FIELD OF TECHNOLOGY

The invention relates to a device for displacing a pull/push rod in steps, with a housing with a drive lever, which is supported by the housing and which displaces a drive element, which engages with the pull/push rod, forward in a clamping direction relative to the housing during an advancing actuation, with a blocking element, which is supported by the housing and which prevents a reverse displacement of the pull/push rod in a release direction directed opposite the clamping direction in a blocking position and which can be displaced from the blocking position into a release position, in which a displacement of the pull/push rod in the release direction is possible, by actuating a release lever, which engages with the blocking element, and with a movement limiting element, which is struck by the blocking element during the forward displacement of the drive element entraining the pull/push rod.

PRIOR ART

A device of the above-described type is described in the DE 10 2013 101 479 A1 on the basis of a tension clamp. The tool described there has a housing, through which a pull/push rod is guided. The housing carries a fixed clamping jaw. A movable clamping jaw is located at one end of the pull/push rod. The clamping jaws can be moved towards one another in a clamping direction in order to be able to clamp a workpiece between the two clamping jaws. The clamping jaws thereby face one another. However, the clamping jaws can also face away from one another, so that the device can be used as spreader clamp. By means of a pumping actuation of a drive lever, which acts on a drive element, the pull/push rod can be displaced in a clamping direction relative to the housing in steps. The pull/push rod is blocked against a reverse displacement in a release direction opposite the clamping direction by means of a blocking element. The blocking element can be brought into a release position, in which a reverse displacement of the pull/push rod is possible, by means of a release lever. The release lever carries a cam, which is to prevent that the blocking element also displaces during the forward displacement of the drive element. The blocking element is to remain as stationary as possible within the housing during the forward displacement of the drive element in order to avoid that the pull/push rod displaces slightly in the release direction at the end of the forward displacement of the drive element, thus after carrying out a working stroke.

Due to an unavoidable wear and manufacturing tolerances, this is not ensured sufficiently in the case of the prior art.

SUMMARY OF THE INVENTION

The invention is based on the object of further developing the generic device in a manner, which is advantageous for its use, and to in particular specify supplementary means, by means of which the slight reverse displacement of the pull/push rod is further reduced after a working stroke.

The object is solved by means of the invention specified in the claims. The subclaims do not only represent advantageous further developments of the device specified in claim 1, but also independent solutions of the object.

It is initially and essentially proposed that the movement limiting element is acted upon by a spring element against the blocking element. The above-mentioned tolerances and also the wear mentioned there can be compensated by means of the spring element. It is provided in a further development of the invention that the blocking element supports itself on a housing-fixed stop in the blocking position in the release direction. The spring element is formed and arranged in such a way that it acts upon the blocking element in the release direction. It is provided in a further development of the invention that the movement limiting element is carried by the release lever. The release lever can be pivoted about a pivot axis or a bearing pin, respectively, when it is displaced from its initial position, in which the blocking element exerts its blocking function, into its release position, in which the pull/push rod can be displaced relative to the blocking element in the release direction. The movement limiting element can thereby rotate about the pivot axis together with the release lever. The spring element can be arranged between release lever and movement limiting element. It is preferably arranged in such a way that the movement limiting element is cushioned relative to the release lever. When the movement limiting element is formed as pivot lever, the spring element can exert a torque on the movement limiting element. If the release lever is also formed as pivot lever, the movement limiting element can pivot relative to the release lever against the restoring force of the spring element. Movement limiting element and release lever are preferably supported about the same pivot axis. The release lever can be supported about the pivot axis with a movement play. For this purpose, the release lever can form a non-circular bearing eye. The bearing eye of the movement limiting element can have a round cross section, so that the movement limiting element is supported on the bearing pin without significant bearing clearance. It is proposed in a further development of the invention that the release lever has a pocket. Based on an axis defined by the pivot axis of the release lever, the pocket can be formed between two walls of the release lever. The release lever can have an actuating flank, with which the fingers of a user of the tool engage in order to displace the release lever. The pocket can have an opening, which is formed towards the side of the release lever facing away from the actuating flank. An arm of the release lever can at least partly protrude through this opening. The spring element can act on the movement limiting element in such a way that the first arm is acted upon in a direction of the actuating flank of the release elver, thus into the pocket. The spring element is preferably arranged in the pocket. A support protrusion, on which an end of a spring element formed by a helical turn pressure spring supports itself, can be arranged in the pocket. The movement limiting element can form a support flank, which lies opposite the support protrusion and on which the other end of the helical turn pressure spring supports itself. The support flank can be formed by a second arm of the movement limiting element, which, in particular at its free end, carries a cam, by means of which the movement limiting element acts upon an end section of the blocking element. The blocking element is acted upon in such a way that the end section acted upon by the cam supports itself on a housing-fixed stop, which can be formed by a pin. The blocking element can be a steel plate with a window, the narrow edges of which have outer edges. In the blocking position, the blocking element is in a canted position relative to the pull/push rod, so that the outer edges of the window engage with narrow sides of the pull/push rod. A spring element, by means of which the blocking element is acted upon into the blocking position, can engage with the end section lying opposite the end section acted upon by the cam. The direction in which the spring element acts upon the blocking element is the same direction, in which the blocking element is acted upon against the stop by means of the movement limiting element. A drive lever is pivotably displaced about a bearing axis for the forward displacement of the pull/push rod. The drive lever can be displaced in the direction of a handle. The drive lever has a drive cam, which acts against a drive element, which can have the same design as the blocking element. The drive element can be formed by one or several steel plates, which each have a window, through which the pull/push rod protrudes. A drive cam, which acts against the drive element in order to displace the drive element relative to the housing, is located at an end section of the drive lever protruding into the housing. This always takes place in a position, which is canted relative to the pull/push rod, so that the drive element entrains the pull/push rod in the clamping direction. A torque is thereby exerted on the blocking element, which supports itself on the movement limiting element, in its release position, so that the pull/push rod can be pushed through the window of the blocking element with slight frictional resistance. At the end of the working stroke, the drive element is displaced from the canted position by means of a spring element and is displaced back into its initial position.

The invention relates in particular to those devices, which are formed as tension or spreader clamp. However, the invention also relates to other devices, for example cartridge discharge devices.

BRIEF DESCRIPTION OF THE DRAWINGS

An exemplary embodiment of the invention will be described below on the basis of enclosed drawings, in which.

DESCRIPTION OF THE EMBODIMENTS

Figure 1:
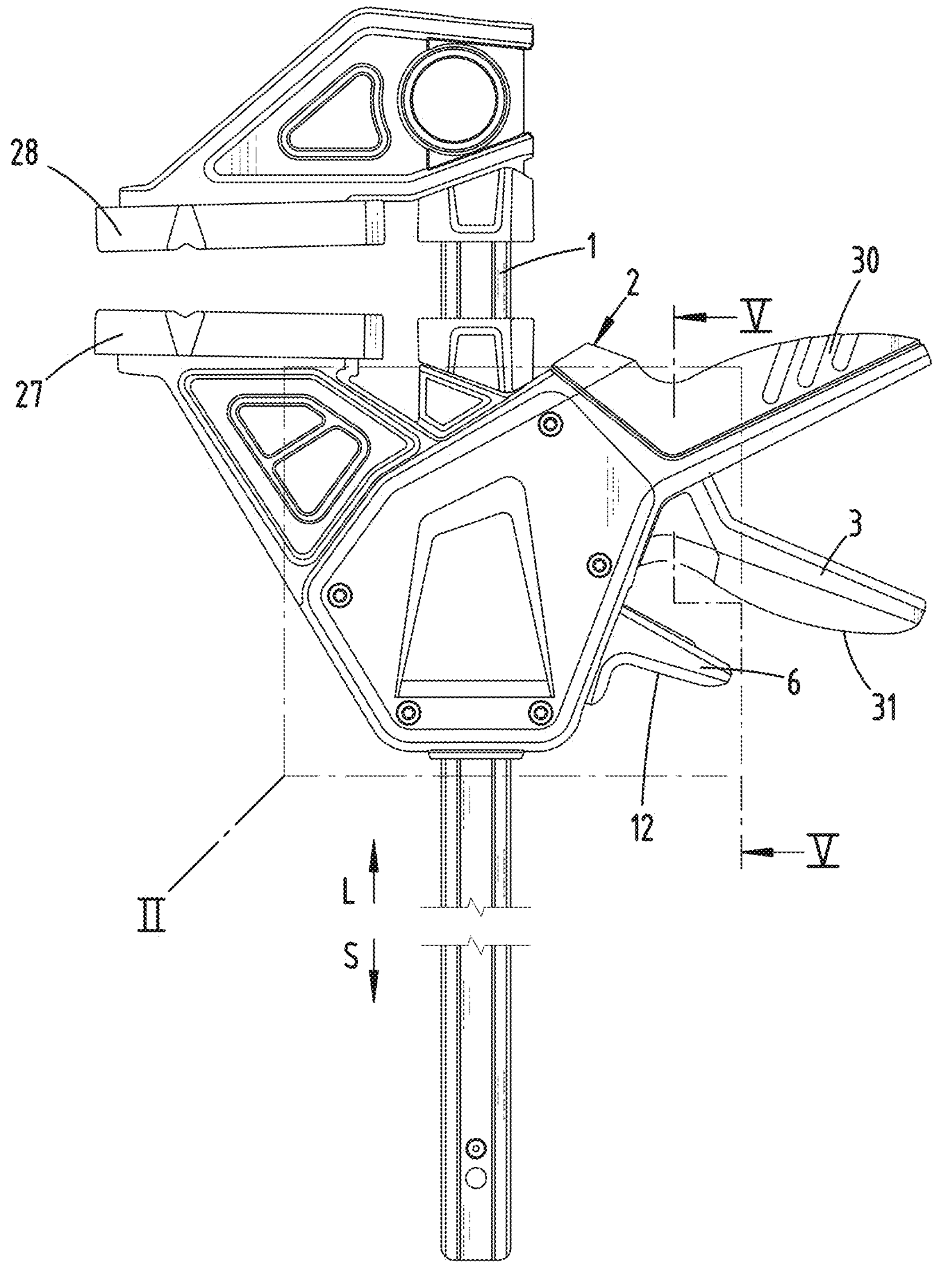
FIG. 1 shows a top view onto an exemplary embodiment of the invention formed as tension clamp.

The exemplary embodiment illustrated in the drawings is a tension clamp, which has a housing 2, which carries a fixed clamping jaw 27. A pull/push rod 1, which consists of steel and has a narrow, rectangular cross section, is guided through the housing 2. A movable clamping jaw 28, which can also be fastened to the other end of the pull/push rod 1 in a known manner, however, is located at one end of the pull/push rod, so that the tool can be used as tension clamp as well as as spreader clamp. The pull/push rod 1 extends through the housing 2.

A handle 30, which can be encompassed by the hand of a user, protrudes from the housing 2. An actuating arm of a drive lever 3 extends between a section of a release lever 6 protruding from the housing 2 and the handle 30. The release lever 6 and the drive lever 3 are each pivotably supported about bearing axes 10, 22 on the housing 2. The drive lever 3 forms a handle section 31, which can be encompassed by the fingers of the hand of the user in order to pivot it to exert a forward displacement in the direction of the handle 30. The release lever 6 has a grip section 12, which can be encompassed by the fingers of the hand of the user, in order to displace the release lever 6 in the direction of the handle 30.

A drive element 4 which, in the case of the exemplary embodiment, is formed by two steel plates, which each have a window, through which the pull/push rod 1 protrudes, is located within the housing 2. A spring element 20 formed as helical turn pressure spring supports the drive element 4 in an initial position against support flanks 37, which hold the drive element 4 in a position, which is essentially perpendicular to the pull/push rod 1, so that the drive element 4 is not canted with the pull/push rod 1. An end section of the drive element 4 is acted upon by means of a pivoting movement of the drive lever by a drive cam 21 of the drive lever 3 in such a way that the drive element 4 cants relative to the pull/push rod 1. The drive element 4 is displaced in the direction of the clamping direction S against the restoring force of the spring element 20 during the pivoting movement.

In the case of the prior art (FIGS. 2 and 3), the blocking element 5, which is likewise a steel plate having a window 33, supports itself on a cam 15 of the release lever 6, which, with respect to the blocking element 5, forms a movement limiting element, in which the cam reduces a displacement of the blocking element 5 in the direction of the clamping direction S. A pull spring 18 engages with the other end of the blocking element 5 in order to act upon it in the release direction L. The end of the blocking element 5 acted upon by the cam 15 supports itself on a stop 8.

During the forward displacement (FIG. 3), the pull/push rod 1 can be displaced against a frictional force through the window 33. The edges 33' of the window 33 canted with the pull/push rod 1 can thereby glide over the narrow sides of the pull/push rod 1. In the position of the blocking element 5 illustrated in FIGS. 2 and 3, it is not possible, however, to displace the pull/push rod 1 in the release direction because the edges 33' cant on the narrow sides of the pull/push rod 1 in this direction.

If the release lever 6 is pivoted, this canted position is eliminated, so that the pull/push rod 1 can be displaced through the window 33 in the release direction L.

Figure 2:
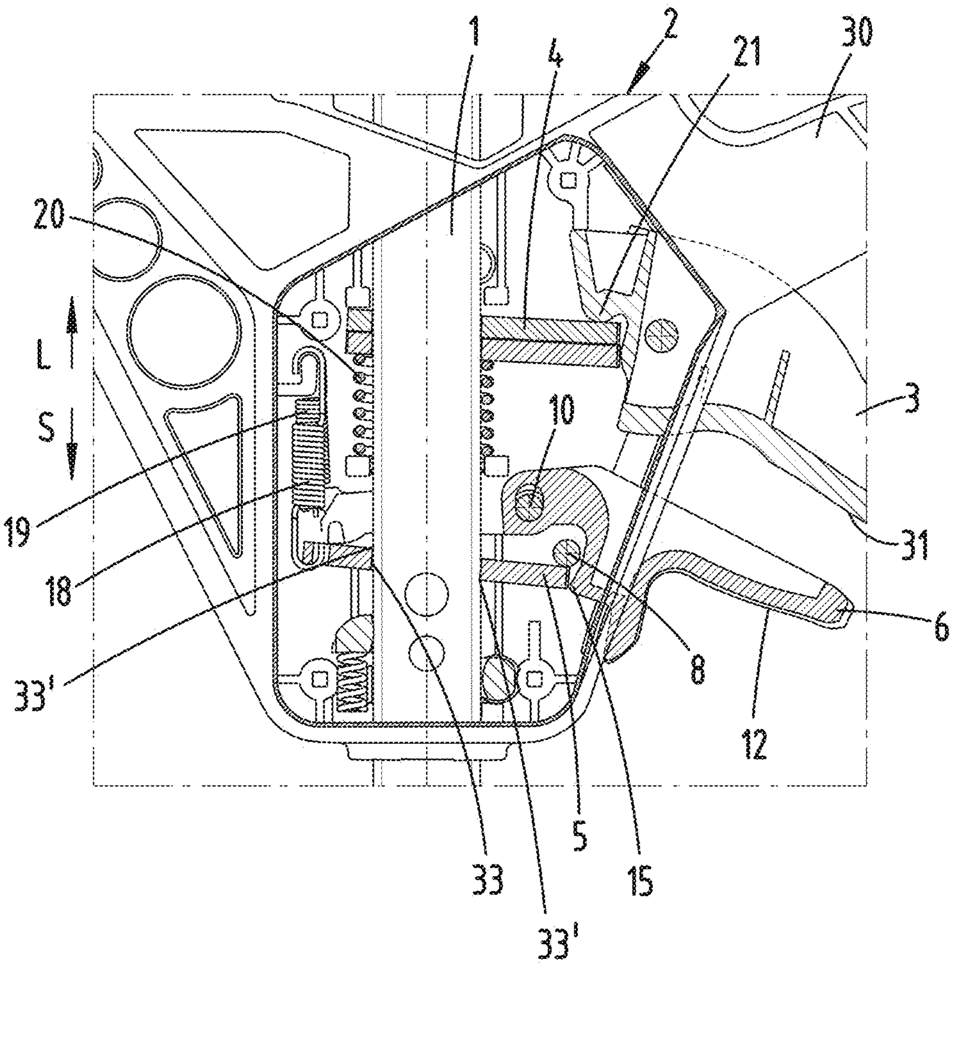
FIG. 2 shows the section II in FIG. 1 but in the case of a tension clamp according to the prior art, wherein a drive lever 3 for the displacement of a pull/push rod 1 by means of a drive element 4 assumes its initial position.
Figure 3:
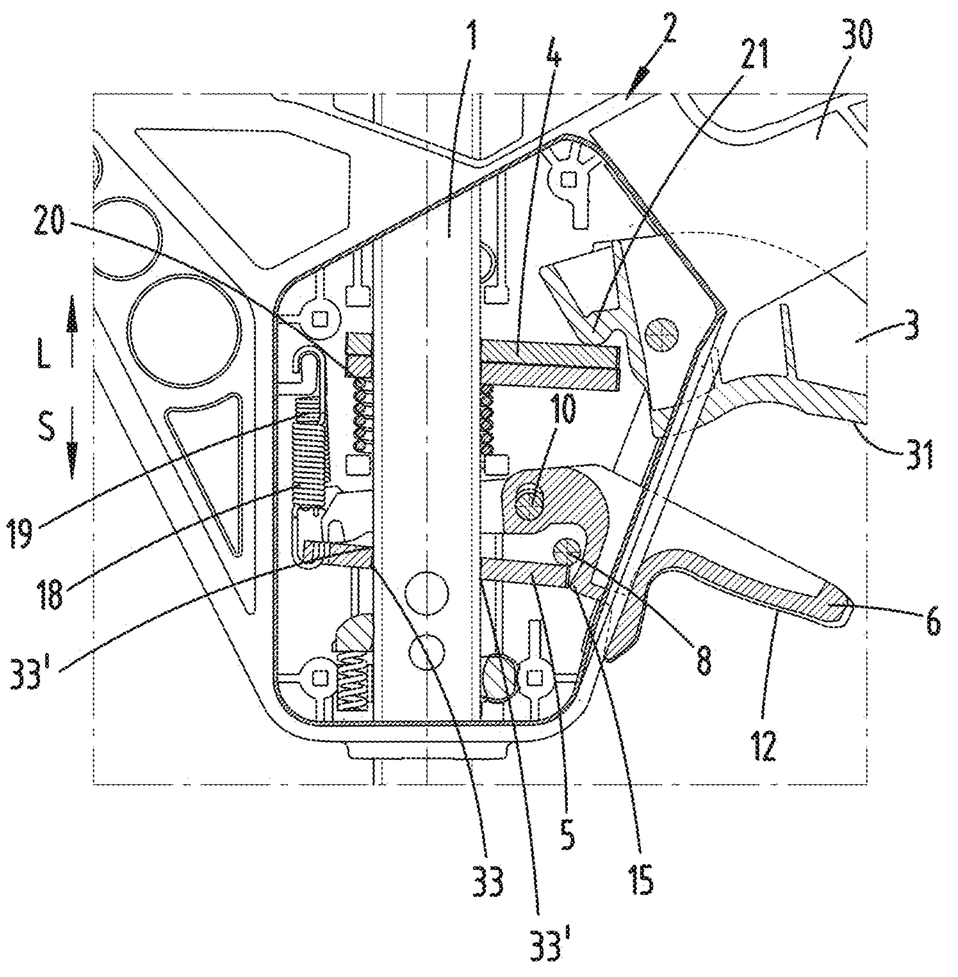
FIG. 3 shows an illustration according to FIG. 2, wherein the drive lever 3 has displaced the drive element 4 and the pull/push rod 1 in the direction of a clamping direction S, wherein a blocking element 5 is acted upon against a cam 15 of a release lever 6.
Figure 4:
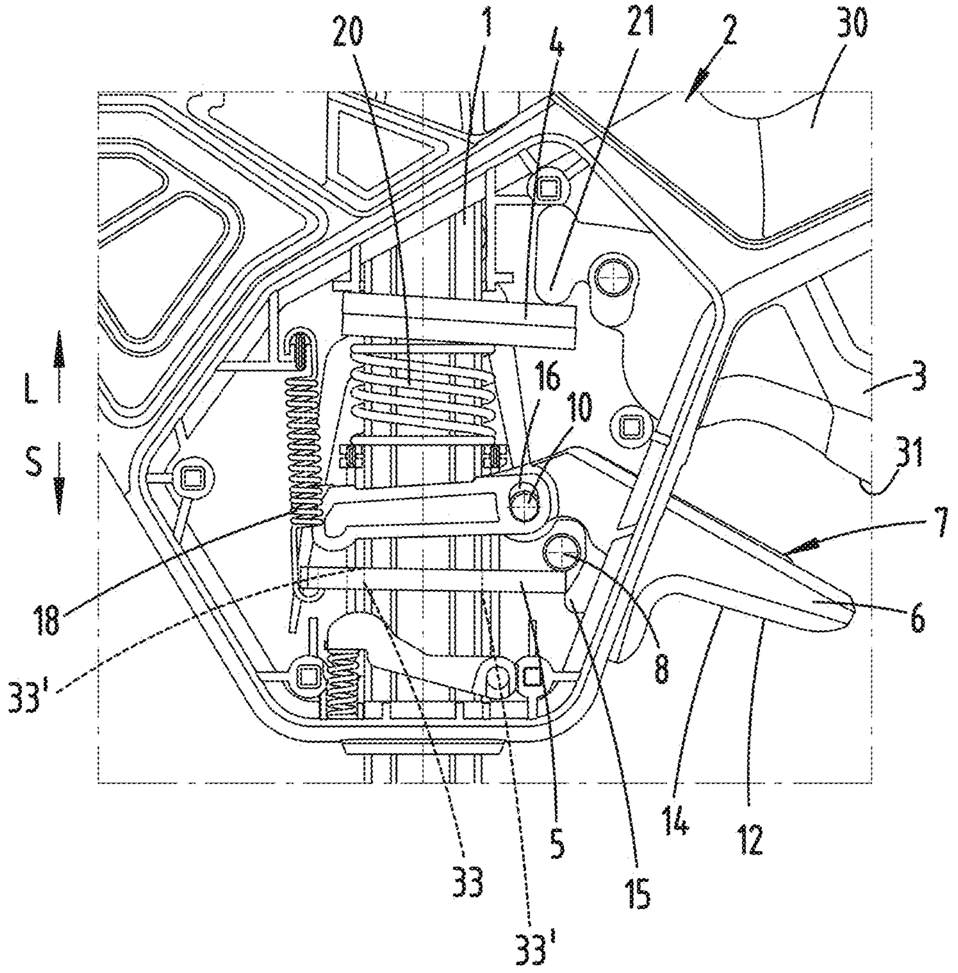
FIG. 4 shows the exemplary embodiment in an operating position illustrated in FIG. 2.
Figure 5:
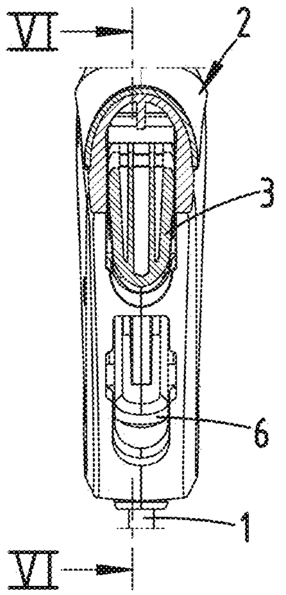
FIG. 5 shows the section according to the line V-V in FIG. 1.
Figure 6:
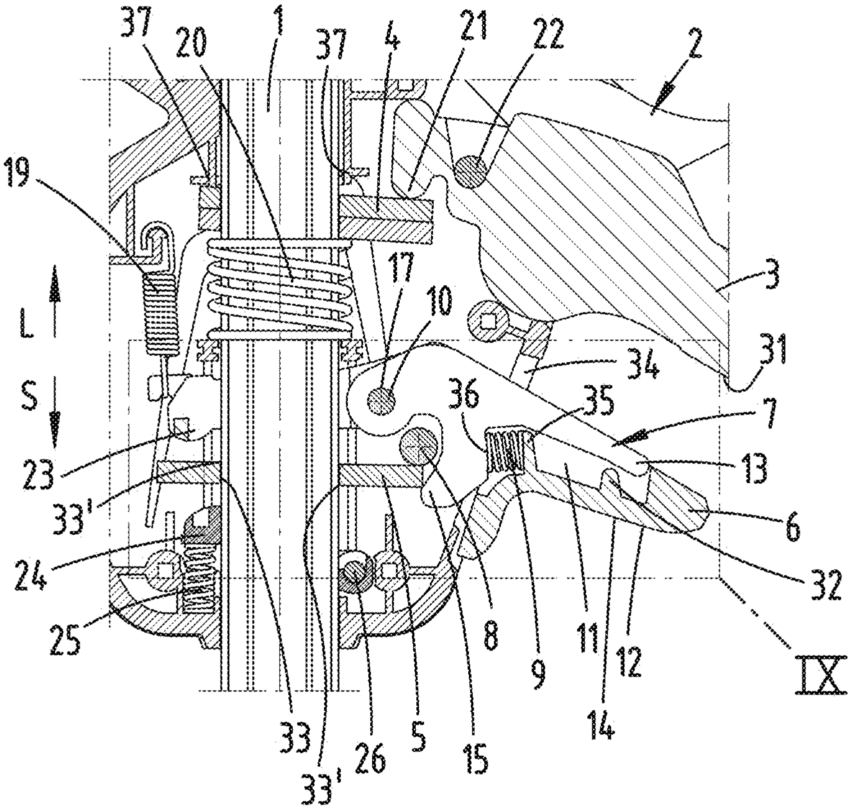
FIG. 6 shows the section according to the line VI-VI in FIG. 5.

Compared to the device, which is illustrated in FIGS. 2 and 3 and which belongs to the prior art, the device according to the invention differs by a spring-actuated movement limiting element 7.

The release lever 6 is a two-armed lever. One arm of the lever protrudes from the housing 2 through a housing opening 34. The other arm of the lever is arranged within the housing 2 and forms a window, through which the pull/push rod 1 is guided. The release lever 6 is supported in the housing 2 about a pivot axis 10 forming a bearing pin, wherein the bearing pin 10 is inserted in a non-circular bearing eye 16 of the release lever 6. The free end of the inner arm of the release lever 6 is acted upon by a tension spring 19 in the release direction L. This free end forms a release cam 23, which acts upon the end, which faces away from the stop 8 and which is acted upon by the spring element 18, during a pivoting of the release lever 6. The spring element 19 displaces the release lever 6 back into its initial position.

The release lever 6 forms a pocket 11, which, in the case of the exemplary embodiment, extends into the grip section 12 of the release lever 6 protruding from the housing 2. This grip section 12 forms the actuating flank 14, which is encompassed by the fingers of the user. On the rear side of the actuating flank 14, the pocket 11 has an opening. The bottom of the pocket 11 forms a protrusion 32. A support protrusion 35 is furthermore provided within the pocket 11. The pocket 11 has two walls, which are arranged one behind the other in an axial direction, based on the pivot axis 10. The movement limiting element 7, which is inserted in the pocket and which is formed by a lever element, extends between the two walls.

The drive lever 3 and the release lever 6 as well as the movement limiting element 7 can be made of plastic. The movement limiting element 7 forms a bearing eye 17, in which a bearing pin is arranged essentially without movement play. In the case of the exemplary embodiment, movement limiting element 7 and release lever 6 can be pivoted about the same pivot axis 10, which is formed by a bearing pin.

The movement limiting element 7 forms a first arm 13, which extends in the pocket 11. A rear side of the arm 13 can have a distance a from the protrusion 32. Depending on manufacturing tolerance or wear, the distance a can vary according to the images 9*a* to 9*c*. A partial section of the arm 13 can protrude from the pocket 11 from an opening oriented away from the actuating flank 14.

The movement limiting element 7 can have a further arm, which carries a cam 15 at its free end. The arm can surround the stop 8 in a curve-shaped manner, which stop can be a steel pin, which is fixedly arranged in the housing.

A spring element 9 is provided, by means of which the cam 15 is acted upon in the direction of the stop 8. The spring element 9 can exert a torque on the movement limiting element 7. The cam 15 engages directly with an end of the blocking element 5, which lies opposite the end of the blocking element 5, with which the spring element 18 engages. The end of the blocking element acted upon by the cam 15 abuts against the stop 8. The force of the spring element 9 has a sufficient size in order to avoid that the cam 15 is brought out of its position fixing the blocking element 5 during a forward displacement of the drive element 4. The force applied to the blocking element 5 by the spring element 9 is thus preferably larger than the force applied by the spring element 18.

The arm of the movement limiting element 7 forming the cam 15 has a support flank 36, which faces away from the cam 15 and on which the spring element 9 formed by a helical turn pressure spring supports itself. The spring element 9 supports itself with its other end on the support protrusion 35 of the pocket 11, so that the spring element 9 is supported within the pocket.

The device further has a braking element 24, which has a window, through which the pull/push rod 1 engages. In a braking position, which avoids that the pull/push rod can displace freely and independently through the housing during an only slight pivoting of the release lever 6, the braking element is acted upon in a braking position by means of a spring element 25. The braking element 24 is displaced from the braking position into a release position against the restoring force of the spring element 25 only when the release lever 6 is pivoted into the position illustrated in FIG. 8.

Figure 8:
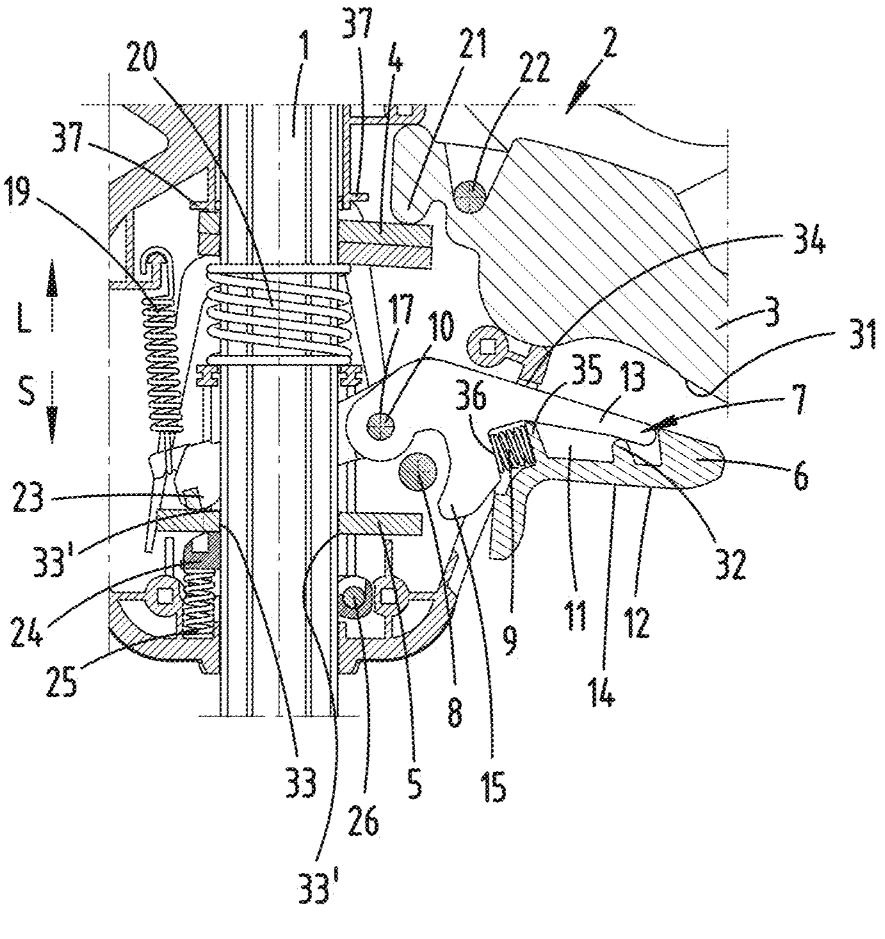
FIG. 8 shows an illustration according to FIG. 6, wherein the release lever 6 has been pivoted from the position illustrated in FIG. 7 after a reverse displacement of the drive lever 3.
Figure 9A:
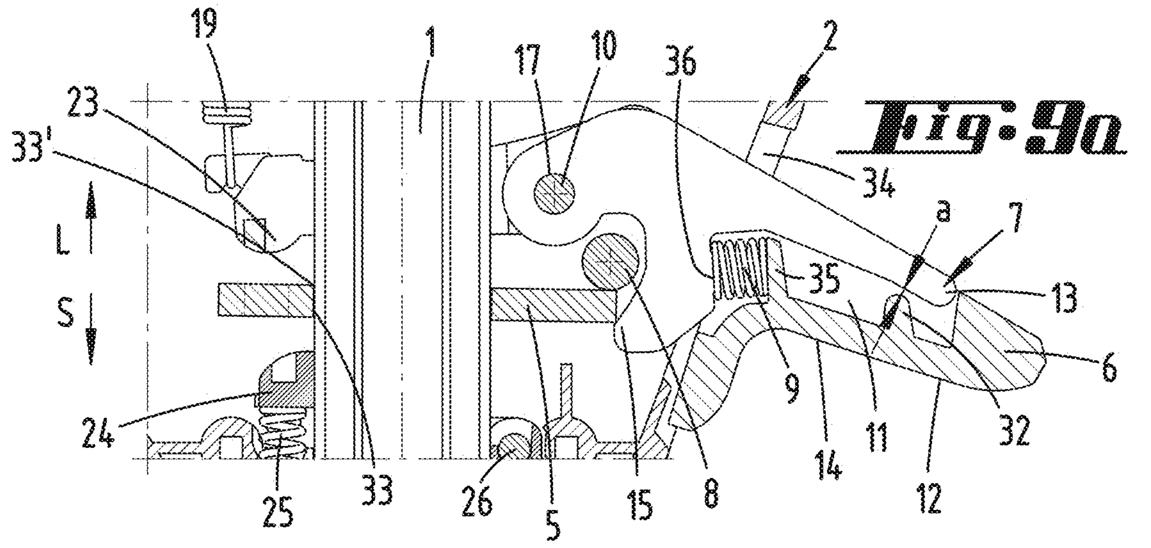
FIG. 9*a* shows the section IX in FIG. 6 in a first constellation, in the case of which a distance a between an arm 13 of the movement limiting element 7 and a protrusion 32 has an average value.
Figure 9B:
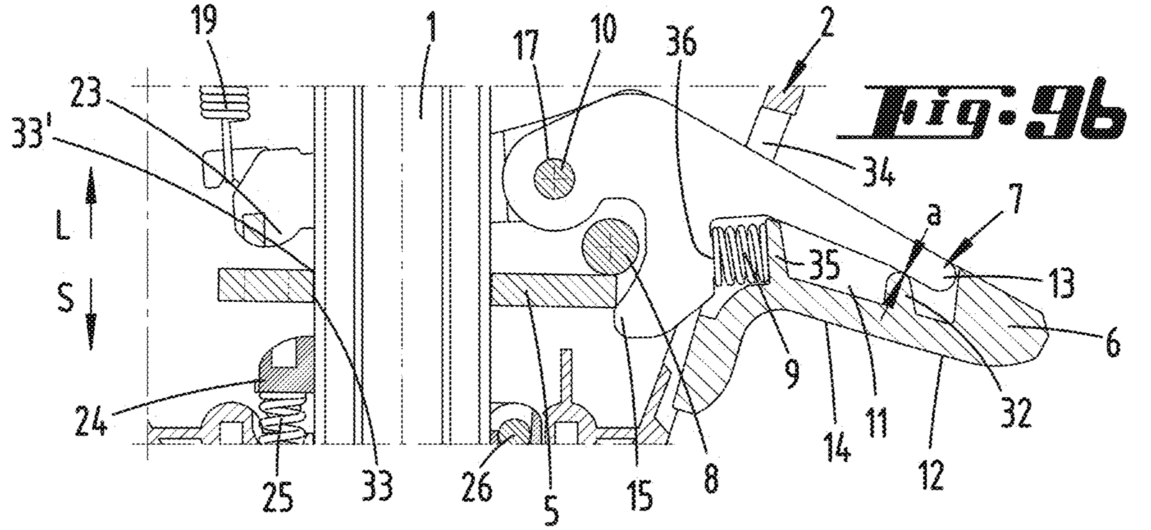
FIG. 9*b* shows an illustration according to FIG. 9*a*, according to which the distance a is minimal.
Figure 9C:
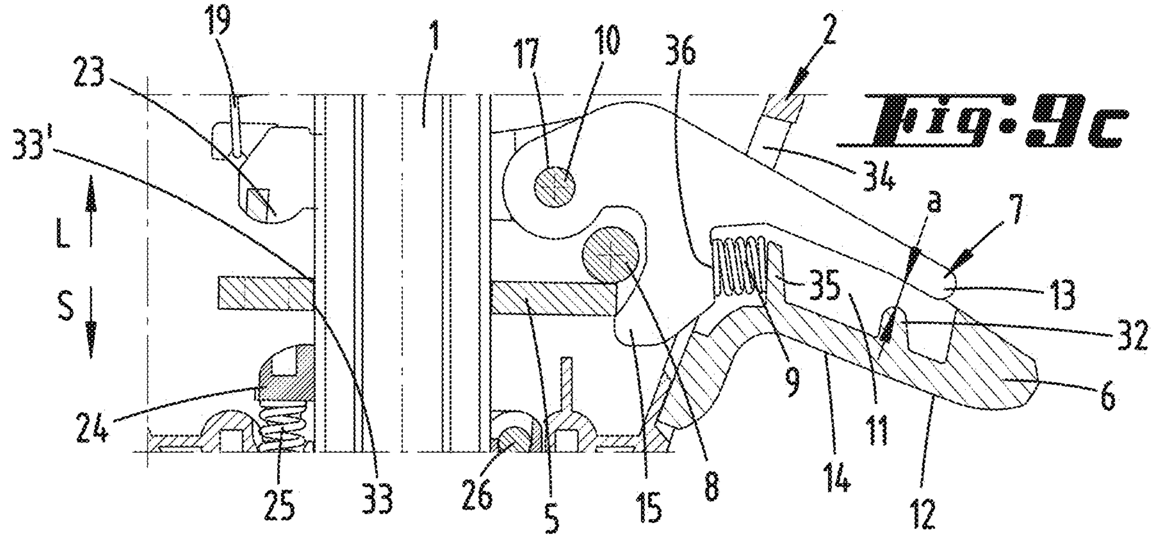
FIG. 9*c* shows an illustration according to FIG. 9*a*, according to which the distance a has a large value.
Figure 10:
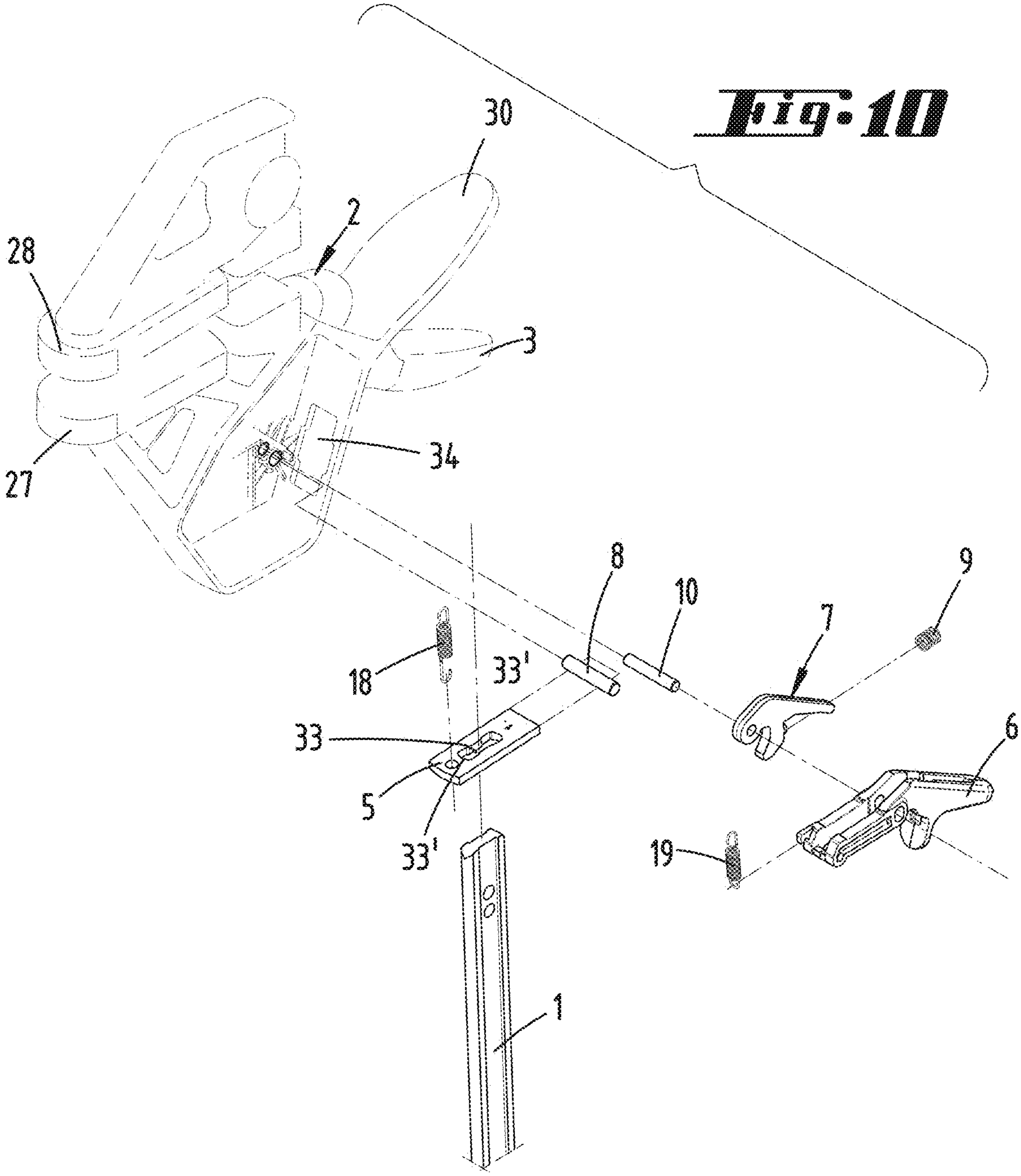
FIG. 10 shows an exploded illustration of essential elements of the exemplary embodiment.

It can further be seen from FIG. 8 that the cam 15 emerges from the movement path of the blocking element 5 during a displacement of the release lever 6 into the release position, so that the blocking element 5 can displace along the pull/push rod 1, until it abuts against the braking element 24.

FIG. 8 furthermore shows that the spring element 9 relaxes in such a way during the actuation of the release lever 6 in the release direction that the arm 13 lying in the pocket 11 rests with its rear side on the protrusion 32. If the release lever 6 is released from the position illustrated in FIG. 8, the release lever is displaced back into its initial position by means of the tensioned tension spring 19. In conjunction with this displacement, the blocking element 5 is displaced back into the position illustrated in FIG. 7 by means of the tension spring 18 engaging with said blocking element. The cam 15 then supports itself again on one of the broadside surfaces of the blocking element 5. The spring element 19 then tensions the spring element 9 because the spring element 19 engaging with the release lever 6 applies a larger force than the spring element 9. The cam 15 then supports itself on a broadside surface of the blocking element 5, force-actuated by the spring element 9.

Figure 7:
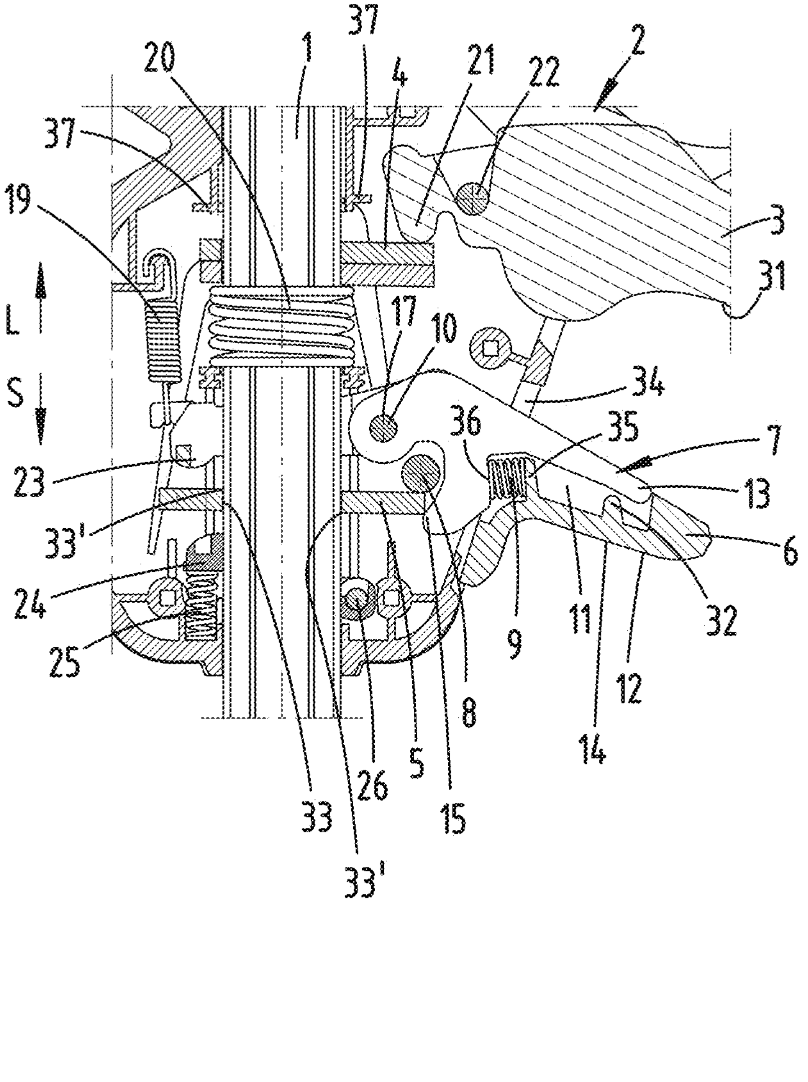
FIG. 7 shows an illustration according to FIG. 6, but wherein the drive lever 3 has been pivoted into a position corresponding to FIG. 3.

If the pull/push rod 1 is held during the displacement from the operating position illustrated in FIG. 8 into the operating position illustrated in FIG. 7, only the release lever 6 displaces. The cam 15 can thereby abut against a narrow side of the blocking element 5. If the pull/push rod 1 is no longer held subsequently, the force of the spring element 18 effects a displacement of the blocking element 5 into the position illustrated in FIG. 7. The spring element 19 simultaneously displaces the release lever 6 into the position illustrated in FIG. 7.

The above statements serve to describe the inventions, which are captured as a whole by the application and which further develop the prior art at least by means of the following feature combinations, in each case also independently, whereby two, several or all of these feature combinations can also be combined, namely:

A device, which is characterized in that the movement limiting element 7 is acted upon by a spring element 9 against the blocking element 5.

A device, which is characterized in that the blocking element 5 supports itself on a housing-fixed stop 8 in the blocking position in the release direction L and the spring element 9 acts upon the blocking element 5 in the release direction L.

A device, which is characterized in that the movement limiting element 7 is carried by the release lever 6 and the spring element 9 is arranged between release lever 6 and movement limiting element 7.

A device, which is characterized in that the release lever 6 is pivotably supported in the housing 2 about a pivot axis 10 and the movement limiting element 7 is pivotably supported about the same pivot axis 10.

A device, which is characterized in that the movement limiting element 7 is arranged in a pocket 11 of the release lever 6, wherein the pocket 11 is open on a side facing away from an actuating flank 14 of the release lever 6.

A device, which is characterized in that the release lever 6 has a grip section 12, which protrudes from the housing 2 and in which a first arm 13 of the movement limiting element 7 is located, wherein the spring element 9 acts on the movement limiting element 7 in such a way that the first arm 13 is acted upon in a direction of the actuating flank 14 of the release lever 6.

A device, which is characterized in that a second arm of the movement limiting element 7, which is located in the interior of the housing 2, has a cam 15, which acts upon the blocking element 5.

A device, which is characterized in that the first arm 13 of the movement limiting element 7 partly protrudes from the pocket 11.

A device, which is characterized in that the release lever 6 is supported with a non-circular bearing eye 16, which allows for a movement play, on a bearing pin forming the pivot axis 10, and the movement limiting element 7 is supported on the bearing pin with a round bearing eye 17, which essentially does not allow for a movement play.

All of the disclosed features (alone but also in combination with one another) are essential for the invention. The disclosure content of the corresponding/enclosed priority documents (copy of the prior application) is herewith also included in its entirety in the disclosure of the application, also for the purpose of adding features of these documents into claims of the present application. With their features, the subclaims characterize, even without the features of a referenced claim, separate inventive further developments of the prior art, in particular in order to file divisional applications on the basis of these claims. The invention specified in each claim can additionally have one or several of the features, which are in particular provided with reference numerals in the above description and/or which are specified in the list of reference numerals. The invention also relates to designs, in the case of which individual features of the features mentioned in the above description are not realized, in particular insofar as they are evidently dispensable for the respective intended purpose or can be replaced by other technically equivalent means.

List of Reference Numerals

| | | | |
|---|---|---|---|
| 1 | pull/push rod | 26 | bearing pin |
| 2 | housing | 27 | fixed clamping jaw |
| 3 | drive lever | 28 | movable clamping jaw |
| 4 | drive element | 30 | handle |
| 5 | blocking element | 31 | grip section |
| 6 | release lever | 32 | protrusion |
| 7 | movement limiting element | 33 | window |
| | | 33' | outer edge |
| 8 | stop | 34 | housing opening |

-continued

List of Reference Numerals

| | | | |
|---|---|---|---|
| 9 | spring element | 35 | support protrusion |
| 10 | pivot axis, bearing pin | 36 | support flank |
| 11 | pocket | 37 | support flank |
| 12 | grip section | | |
| 13 | arm | | |
| 14 | actuating flank | | |
| 15 | cam | S | clamping direction |
| 16 | bearing eye | L | release direction |
| 17 | bearing eye | | |
| 18 | spring element | | |
| 19 | spring element | | |
| 20 | spring element | | |
| 21 | drive cam | | |
| 22 | bearing pin | | |
| 23 | release cam | | |
| 24 | braking element | | |
| 25 | spring element | | |

The invention claimed is:

1. A device for displacing a pull/push rod (1) in steps, comprising:

a housing (2), a drive lever (3), which is supported by the housing (2) and which displaces a drive element (4), which is configured to engage with the pull/push rod (1), forward in a clamping direction(S) relative to the housing (2) during an advancing actuation, a blocking element (5), which is supported by the housing (2) and which is configured to prevent a reverse displacement of the pull/push rod (1) in a release direction (L) directed opposite the clamping direction(S) in a blocking position and which is displaceable from the blocking position into a release position, in which a displacement of the pull/push rod (1) in the release direction (L) is possible, by actuating a release lever (6), which engages with the blocking element (5), and a movement limiting element (7) acting upon the blocking element (5), the movement limiting element (7) preventing the blocking element (5) from being displaced during the forward displacement of the drive element (4) entraining the pull/push rod (1), wherein the movement limiting element (7) is acted upon by a spring element (9) against the blocking element (5).

2. The device according to claim 1, wherein the blocking element (5) supports itself on a housing-fixed stop (8) in the blocking position in the release direction (L) and the spring element (9) acts upon the blocking element (5) in the release direction (L).

3. The device according to claim 1, wherein the movement limiting element (7) is carried by the release lever (6) and the spring element (9) is arranged between the release lever (6) and the movement limiting element (7).

4. The device according claim 1, wherein the release lever (6) is pivotably supported in the housing (2) about a pivot axis (10) and the movement limiting element (7) is pivotably supported about the pivot axis (10).

5. The device according to claim 1, wherein the movement limiting element (7) is arranged in a pocket (11) of the release lever (6), wherein the pocket (11) is open on a side facing away from an actuating flank (14) of the release lever (6).

6. The device according to claim 5, wherein the release lever (6) has a grip section (12), which protrudes from the housing (2) and in which a first arm (13) of the movement limiting element (7) is located, wherein the spring element (9) acts on the movement limiting element (7) in such a way that the first arm (13) is acted upon in a direction of the actuating flank (14) of the release lever (6).

7. The device according to claim 6, wherein a second arm of the movement limiting element (7), which is located in the interior of the housing (2), has a cam (15), which acts upon the blocking element (5).

8. The device according to claim 5, wherein the first arm (13) of the movement limiting element (7) partly protrudes from the pocket (11).

9. The device according to claim 1, wherein the release lever (6) is supported with a non-circular bearing eye (16), which allows for a movement play, on a bearing pin forming the pivot axis (10), and the movement limiting element (7) is supported on the bearing pin with a round bearing eye (17), which -does not allow for a movement play.

* * * * *